(12) United States Patent
Digmann et al.

(10) Patent No.: US 8,042,307 B2
(45) Date of Patent: Oct. 25, 2011

(54) HEAD CURTAINS FOR DOCK SHELTERS OR DOCK SEALS

(75) Inventors: Charles J. Digmann, Dubuque, IA (US); Timothy J. Schmidt, Dubuque, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 75 days.

(21) Appl. No.: 12/129,159

(22) Filed: May 29, 2008

(65) Prior Publication Data

US 2009/0293371 A1    Dec. 3, 2009

(51) Int. Cl.
*E04B 2/00* (2006.01)
(52) U.S. Cl. .................. 52/173.2; 52/173.1; 160/330
(58) Field of Classification Search .............. 52/2.12, 52/2.13, 173.1, 173.2
See application file for complete search history.

(56) References Cited

U.S. PATENT DOCUMENTS

| | | | |
|---|---|---|---|
| 2,565,393 A | 8/1951 | Oswald | |
| 2,892,463 A | 6/1959 | Frommelt et al. | |
| 3,095,886 A | 7/1963 | Frommelt et al. | |
| 3,181,205 A | 5/1965 | Frommelt et al. | |
| 3,230,675 A | 1/1966 | Frommelt et al. | |
| 3,303,615 A | 2/1967 | O'Neal | |
| 3,322,132 A | 5/1967 | Rieder et al. | |
| 3,352,314 A | 11/1967 | Frommelt et al. | |
| 3,391,503 A | 7/1968 | O'Neal | |
| 3,403,489 A | 10/1968 | Frommelt et al. | |
| 3,538,655 A | 11/1970 | Frommelt et al. | |
| 3,557,508 A | 1/1971 | Frommelt et al. | |
| 3,638,667 A | 2/1972 | Frommelt et al. | |
| 3,653,155 A | 4/1972 | de Brunyn, Jr. et al. | |
| 3,653,173 A | 4/1972 | Frommelt et al. | |
| 3,665,997 A | 5/1972 | Smith et al. | |

(Continued)

FOREIGN PATENT DOCUMENTS

EP    1174063    1/2002

(Continued)

OTHER PUBLICATIONS

Patent Cooperation Treaty, "International Search Report," issued by the International Searching Authority in connection with PCT application No. PCT/US2009/042574, mailed Jul. 20, 2009 (5 pages).

(Continued)

*Primary Examiner* — Brian E Glessner
*Assistant Examiner* — Patrick Maestri
(74) *Attorney, Agent, or Firm* — Hanley, Flight & Zimmerman, LLC (57) ABSTRACT

Head curtains for dock shelters or dock seals are disclosed. An example head curtain assembly for a vehicle loading dock includes a retractable curtain stiffened by a resiliently compressible foam panel that is more flexible about a horizontal axis than about a vertical axis. The difference in directional flexibility can be created by sewing the foam panel to a pliable cover using a series of parallel horizontal thread lines. The thread lines create in the foam a series of compressed indentations that run horizontally across the curtain so that the curtain tends to bend more easily along those lines. The relative stiffness in the horizontal direction enables the curtain to exert an appreciable sealing force against two lateral dock seal members, and the vertical flexibility makes the curtain easy to retract to accommodate vehicles of various heights. Touch-and-hold fasteners make many of the individual components of the head curtain readily replaceable.

31 Claims, 11 Drawing Sheets

U.S. PATENT DOCUMENTS

| | | |
|---|---|---|
| 3,699,733 A | 10/1972 | Frommelt et al. |
| 3,772,839 A | 11/1973 | Timbers |
| 3,792,559 A | 2/1974 | Frommelt et al. |
| 3,816,867 A | 6/1974 | Shirzad et al. |
| 3,826,049 A | 7/1974 | Frommelt et al. |
| RE28,391 E | 4/1975 | Frommelt et al. |
| 3,875,954 A | 4/1975 | Frommelt et al. |
| 3,915,183 A | 10/1975 | Frommelt |
| 3,934,380 A | 1/1976 | Frommelt et al. |
| 3,935,684 A | 2/1976 | Frommelt et al. |
| 3,939,614 A | 2/1976 | Frommelt et al. |
| 3,994,103 A | 11/1976 | Ouellet |
| 4,045,925 A | 9/1977 | O'Neal |
| 4,262,458 A | 4/1981 | O'Neal |
| 4,322,923 A | 4/1982 | O'Neal |
| 4,381,631 A | 5/1983 | Frommelt |
| 4,389,821 A * | 6/1983 | O'Neal .................... 52/2.13 |
| 4,554,768 A | 11/1985 | Srajer |
| 4,601,142 A | 7/1986 | Frommelt |
| 4,671,029 A | 6/1987 | Bennett et al. |
| 4,718,207 A | 1/1988 | Frommelt |
| 4,750,299 A | 6/1988 | Frommelt et al. |
| 4,799,341 A | 1/1989 | Frommelt et al. |
| 4,805,362 A | 2/1989 | Frommelt et al. |
| 4,821,468 A | 4/1989 | Moore |
| 4,873,800 A | 10/1989 | Frommelt et al. |
| 5,007,211 A | 4/1991 | Ouellet |
| 5,055,335 A | 10/1991 | Wicks |
| 5,109,639 A | 5/1992 | Moore |
| 5,125,196 A | 6/1992 | Moody |
| 5,622,016 A | 4/1997 | Frommelt et al. |
| 5,675,945 A | 10/1997 | Giuliani et al. |
| 6,854,224 B2 * | 2/2005 | Thill et al. .................... 52/173.2 |
| 7,185,463 B2 * | 3/2007 | Borgerding .................. 52/173.2 |
| 2003/0140579 A1 | 7/2003 | Hoffmann et al. |

FOREIGN PATENT DOCUMENTS

| | | |
|---|---|---|
| EP | 1550624 | 7/2005 |
| GB | 0004194 | 2/1907 |

OTHER PUBLICATIONS

Patent Cooperation Treaty, "Written Opinion," issued by the International Searching Authority in connection with PCT application No. PCT/US2009/042574, mailed Jul. 20, 2009 (6 pages).

International Bureau, "International Preliminary Report on Patentability," issued in connection with international application serial No. PCT/US2009/042574, issued Nov. 30, 2010, 7 pages.

European Patent Office, "Office Communication," issued in connection with European application serial No. 09 755 599.9, issued May 31, 2011, 3 pages.

* cited by examiner

HEAD CURTAINS FOR DOCK SHELTERS OR DOCK SEALS

FIELD OF THE DISCLOSURE

The subject disclosure generally pertains to loading dock shelters and dock seal systems, and more specifically, to head curtains for such systems.

BACKGROUND

Trucks having open rear cargo bays are typically backed into alignment with a loading dock or other doorway of a building to facilitate loading and unloading of the vehicle. A significant gap is usually created between the rear of the truck and the face of the building, which exposes the interiors of the building and the truck to the outside environment during loading and unloading. Such gaps can be at least partially sealed by installing either a loading dock shelter or a loading dock seal around the perimeter of the doorway.

To seal or shelter the vehicle's rear vertical edges, dock shelters and dock seals usually have some type of lateral weather barrier installed along the side edges of the doorway. For dock shelters, the weather barrier usually shelters or seals against the vertical sides of the vehicle's trailer. An example of such an approach is shown in U.S. Pat. No. 3,322,132. Dock seals, on the other hand, usually have lateral weather barriers that are resiliently compressible for conformingly sealing against the vertical rear edges of the vehicle. An example of such an approach is shown in U.S. Pat. No. 5,125,196. Regardless of the structural design of the lateral weather barrier, the upper rear edge of the vehicle is often sealed or sheltered by a head curtain that drapes down onto the top of the vehicle as the vehicle backs into the dock.

If the head curtain is extra long to accommodate a broad range of vehicle heights, the dock shelter or dock seal might include means for vertically retracting the curtain so that the curtain length is appropriate for the height of the particular vehicle at the dock. Thus, the curtain needs to be flexible not only for deflecting in reaction to the vehicle backing into the dock, but also for enabling the curtain to be retracted. Such flexibility or compliance, however, can weaken or hinder the curtain's ability to forcibly seal against the rear upper edge of the vehicle. Thus, instead of the curtain applying sealingly tight pressure against the upper edge of the vehicle, a pliable curtain readily deflects backwards toward the doorway of the dock.

DETAILED DESCRIPTION

FIGS. 1-6 show a loading dock apparatus 10 that helps seal and/or shelter the rear access opening of a truck/trailer vehicle 12 at a loading dock 14. Dock 14 includes a doorway 16 in a wall 18 of a building. The dock apparatus 10 provides a barrier to weather and other elements as the vehicle's cargo is being loaded or unloaded at the doorway. To accommodate vehicles of various heights, dock apparatus 10 includes a head curtain assembly 20 with a retractable curtain 22 that seals along the vehicle's upper rear edge.

To seal or shelter the vehicle's rear side edges, an upper sealing assembly illustratively in the form of a head curtain assembly 20 could be used with a dock shelter that includes lateral weather barriers or side panels that are relatively rigid and incompressible. Head curtain assembly 20, however, is particularly suited for a dock seal 24 having lateral weather barriers in the form of resiliently compressible side pads 26, thus assembly 20 will be described and illustrated with reference to dock seal 24.

Figure 1:
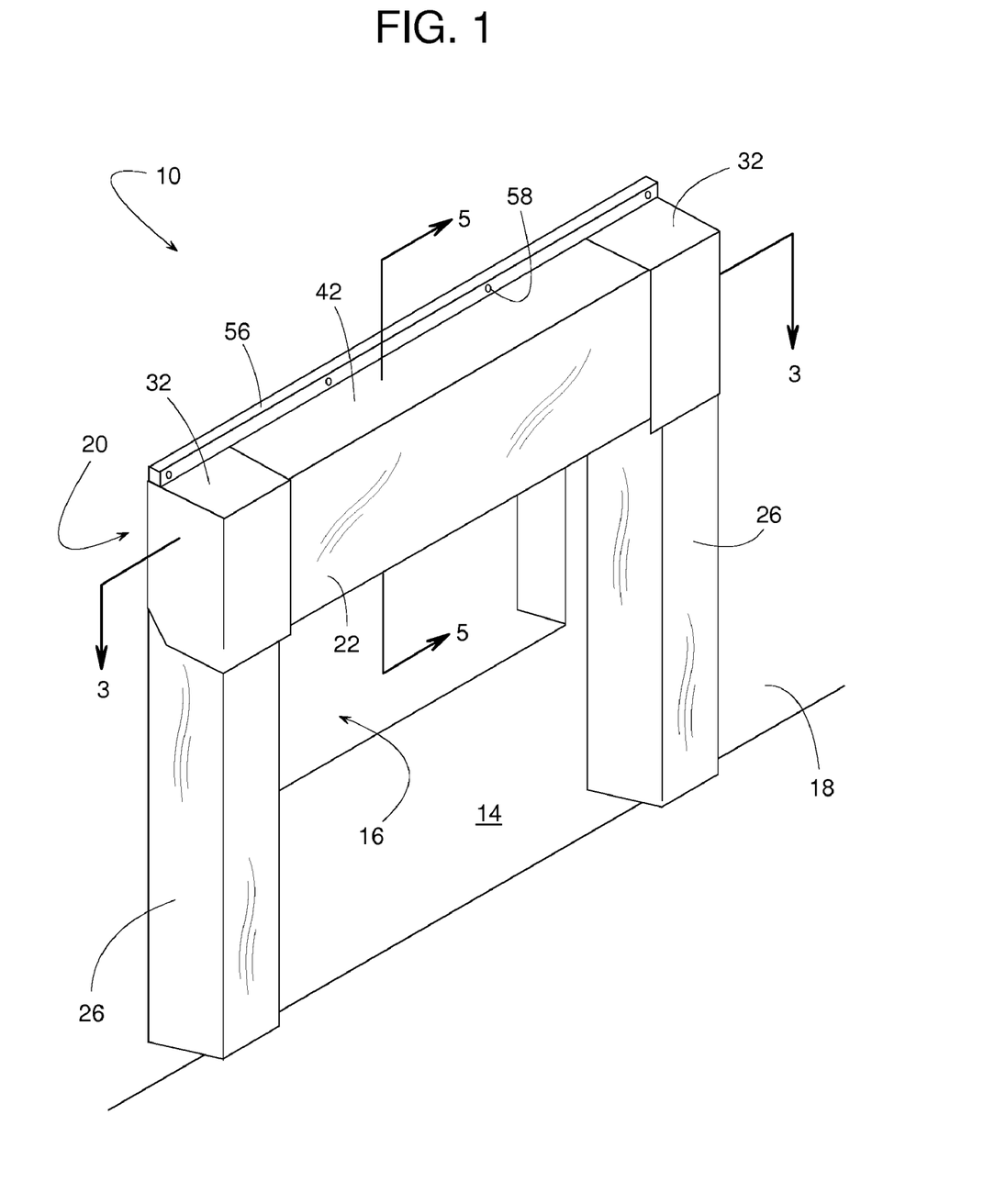
FIG. 1 is a perspective view of an example dock apparatus described herein.
Figure 2:
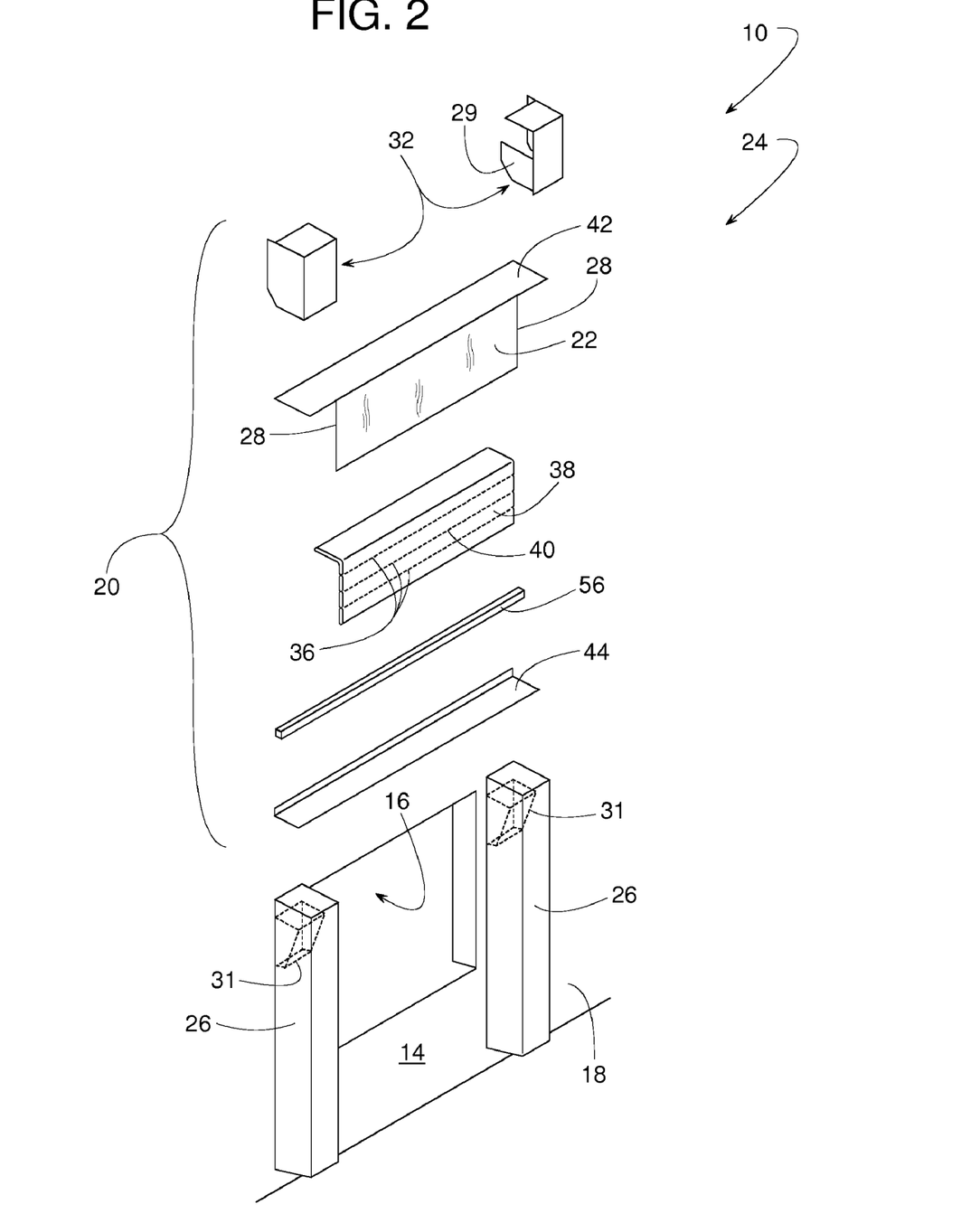
FIG. 2 is an exploded perspective view of the example dock apparatus of FIG. 1.
Figure 3:
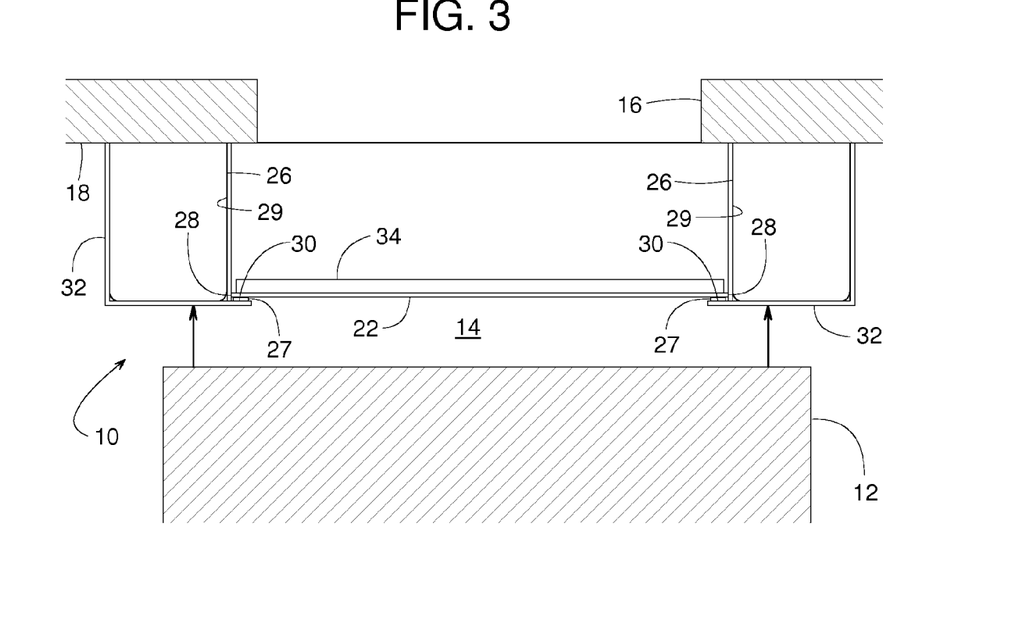
FIG. 3 is a cross-sectional view of the example dock apparatus of FIG. 1 taken along line 3-3 of FIG. 1.

Lateral edges 28 of curtain 22 preferably seal against the inner surfaces of side pads 26 (as shown in FIG. 3) and/or seal against an inner surface 30 of a pair of flexible boots 32 that protect the upper ends of side pads 26. A touch-and-hold fastener 27 (e.g., a fabric hook-and-loop fastener such as VELCRO™) can help seal edges 28 to surface 30. As an alternative to conventional windstraps, an inner flexible panel 29 on boot 32 is coupled to wall 18 to help prevent vehicle 12 from pulling curtain assembly 20 away from wall 18 as vehicle 12 departs dock 14. The connection 27 between edges 28 and surface 30 also helps prevent curtain assembly 20 from uncontrolled movement in strong winds when not engaged by a vehicle. To minimize wear, side pads 26 may include one or more cavities 31 (FIG. 2) that reduce the compressive forces in certain localized areas, such as in the area behind boots 32.

Figure 4:
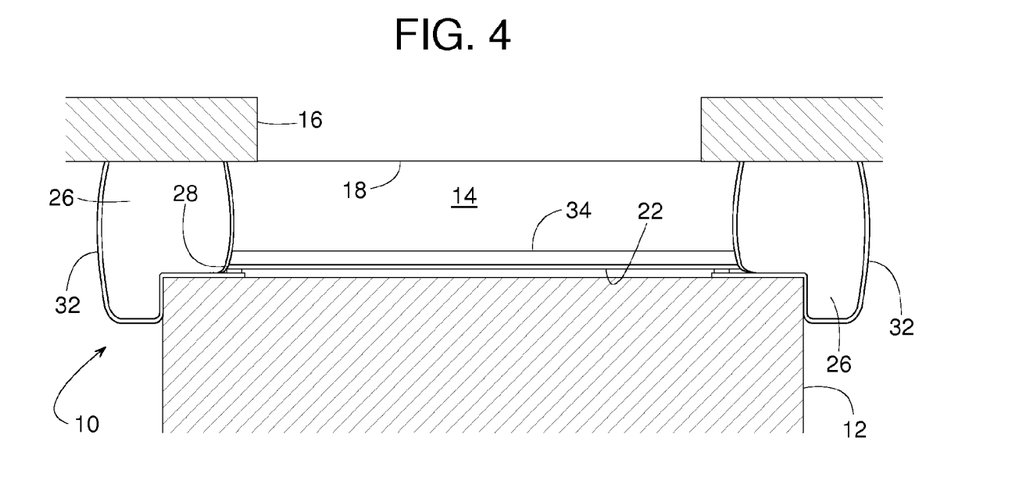
FIG. 4 is a cross-sectional view similar to FIG. 3 but showing a vehicle engaging the dock apparatus of FIGS. 1, 2, and 3.

When side pads 26 are compressed by the rear end of vehicle 12, as shown in FIG. 4, pads 26 tend to bulge and push inward against the lateral edges 28. To maintain a positive seal at edges 28, a resiliently compressible foam panel 34 (covered by item 38) may be included to increase the rigidity or stiffness (e.g., horizontal rigidity) to curtain 22. In addition to improved sealing at edges 28, the curtain's increased horizontal stiffness in conjunction with pads 26 bulging inward firmly retains curtain 22 between pads 26, and the bulging sections forcibly hold curtain 22 sealingly tight against the rear upper edge of vehicle 12.

Figure 5:
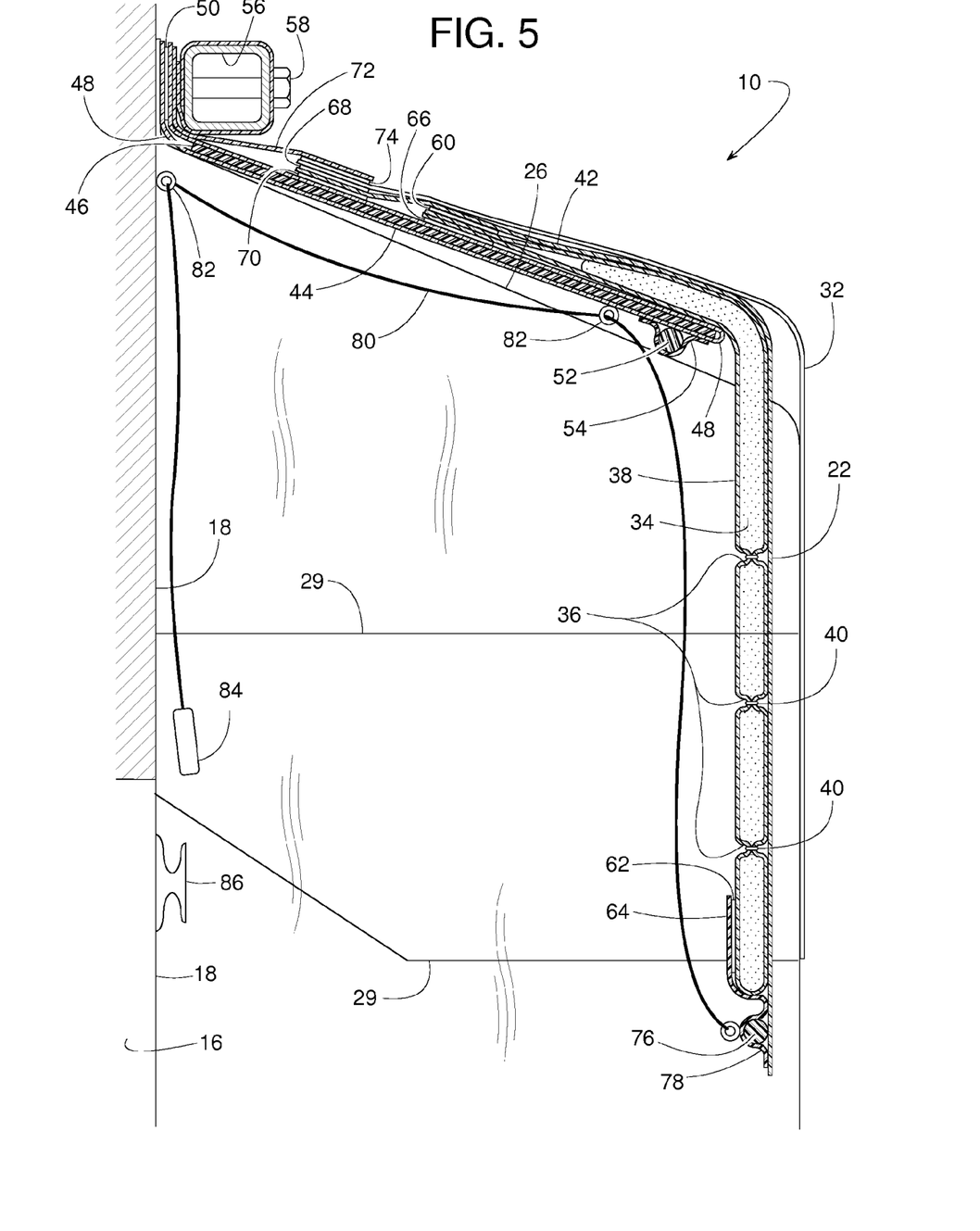
FIG. 5 is a cross-sectional view of the example dock apparatus of FIG. 1 taken along line 5-5 of FIG. 1.
Figure 6:
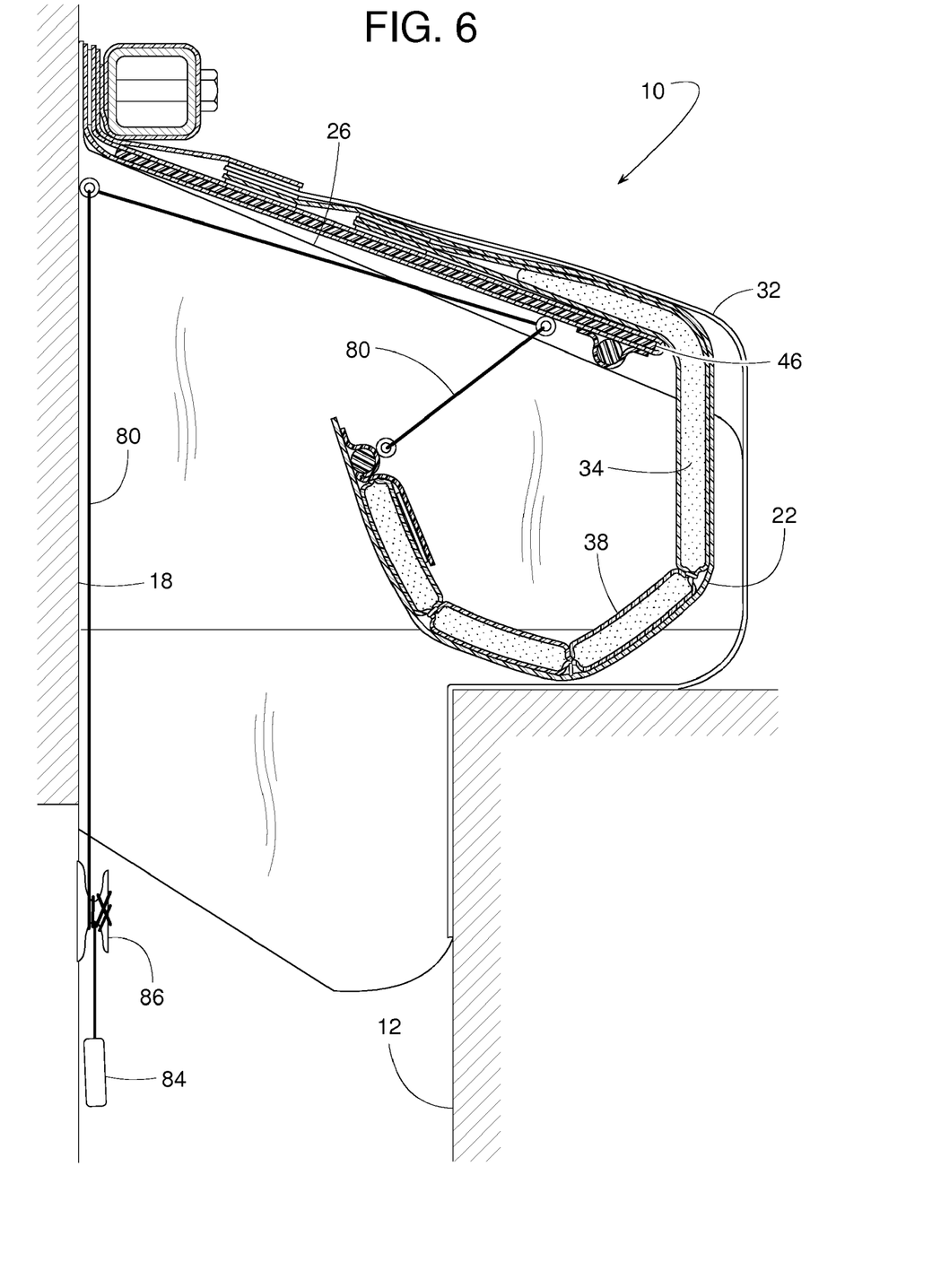
FIG. 6 is a cross-sectional view similar to FIG. 5 but showing a head curtain assembly of the dock apparatus of FIGS. 1-5 in a retracted position.

To ensure that the horizontal stiffness does not hinder the curtain's ability to retract vertically from the position of FIG. 5 to that of FIG. 6, foam panel 34 includes a series of compressed indentations 36 or bending creases that render panel 34 more flexible about a horizontal axis than about a vertical axis. Indentations 36 can be created or formed by sewing panel 34 to a pliable cover 38, in which the sewing process produces a plurality of stitches 40 that holds the indentations in compression. Other methods of producing compressed indentations 36 include, but are not limited to, localized ultrasonic or heat sealing of cover 38 to foam panel 34 or localized ultrasonic or heat sealing of foam panel 34 to itself. Regardless of how indentations 36 are formed, maintaining foam panel 34 as a unitary piece, as opposed to a plurality of segments, simplifies manufacturability and provides a neat, clean appearance.

The assembly of dock apparatus 10 is perhaps best understood with reference to FIGS. 2 and 5. Side pads 26 can be attached to wall 18 using any suitable means including, but not limited to, methods that are well known to those of ordinary skill in the art. To support foam panel 34, curtain 22, and an upper sheet 42 extending from curtain 22, the head curtain assembly 20 of the illustrated example includes a resiliently crushable support panel 44 atop side pads 26. In some examples, support panel 44 comprises a semi-rigid polymeric sheet 46 (e.g., polyethylene, polypropylene, fiberglass, etc.) encased within a pliable cover 48. The semi-rigidity panel 44 makes it more impactable and durable than other conventional frameworks that are substantially rigid and readily damaged by vehicular impact. Panel 44 may be designed so that it could be impacted by a vehicle and compressed all the way to the loading dock wall without damage—a function not found in a conventional rigid frame.

A touch-and-hold fastener 50 (e.g., a fabric hook-and-loop fastener such as VELCRO™) can be used to contain sheet 46 within cover 48. A resiliently flexible horizontal elongate polymeric stay 52 (e.g., rod, bar, tube, etc. made of polyethylene, polypropylene, fiberglass, etc.) can be attached to panel 44 to provide support panel 44 with additional stiffness. Stay 52 can be held within a sleeve illustratively depicted as a loop of material 54 so that stay 52 can be readily replaced if necessary. A tube 56 or bar anchored to wall 18 via a series of fasteners 58 can be used for attaching an upper flange of support panel 44 to wall 18.

To provide head curtain assembly 20 with various components that can be readily replaced individually, touch-and-hold fasteners can be used throughout the assembly. A touch-and-hold fastener 60, for example, can attach an upper end of the creased foam panel's cover 38 to upper sheet 42, and another touch-and-hold fastener 62 can connect the lower end of cover 38 to a lip 64 extending from curtain 22, thereby removably attaching foam panel 34 to curtain 22. An additional touch-and-hold fastener 66 can removably attach cover 38 to support panel 44. Other touch-and-hold fasteners 68 and/or 70 can fasten upper sheet 42 to support panel 44 and/or to a flap 72 anchored to wall 18. Flexible boots 32 that help protect the upper ends of side pads 26 can also be removably attached using a touch-and-hold fastener 74 so that boots 32 are readily replaceable.

A resiliently flexible horizontal polymeric stay 76 (e.g., rod, bar, tube, etc. made of polyethylene, polypropylene, fiberglass, etc.) can be attached to the lower end of curtain 22 to provide curtain 22 with additional horizontal stiffness. Stay 76 can be held within a loop of material 78 so that stay 76 can be readily replaced if necessary. Stay 76 with or without additional weight can also help hold curtain 22 taut (e.g., vertically taut) so that curtain 22 can lie relatively flat when fully extended, as shown in FIG. 5.

To raise curtain 22 from its position of FIG. 5 to that of FIG. 6, a pull cord 80 (i.e., any pliable elongate member, such as a rope, strap, chain, etc.) attached to a lower end of curtain 22 can be threaded through a series of pulleys or eyelets 82 with one end 84 of cord 80 available for an operator (e.g., a manual operator or a mechanical operator) to pull cord 80 so as to raise curtain 22. If cord 80 is manually pulled, curtain 22 can be held at a raised position by temporarily securing cord 80 to a cleat 86 anchored to wall 18, as shown in FIG. 6.

Figure 7:
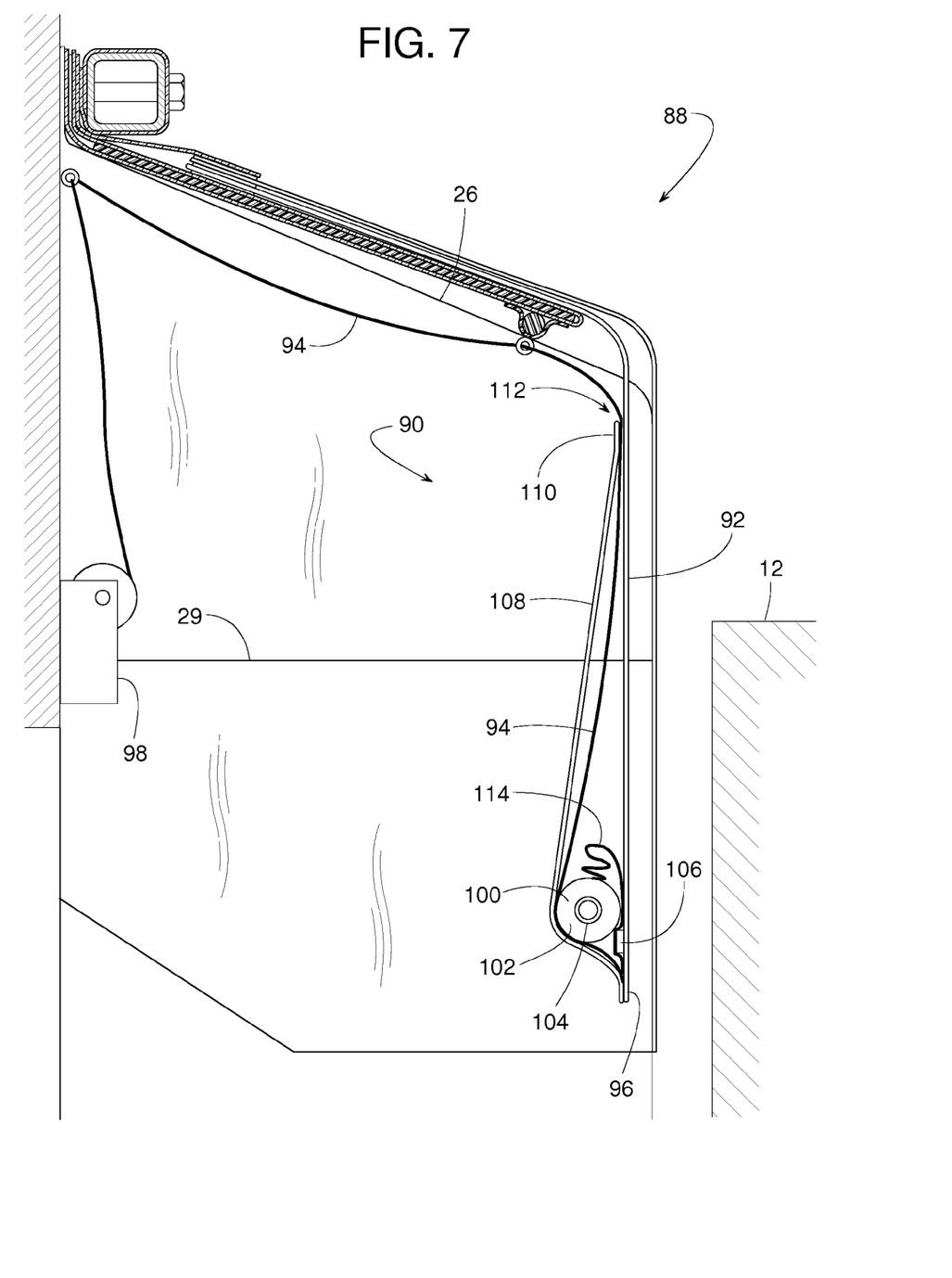
FIG. 7 is a cross-sectional view similar to FIG. 5 but showing another example dock apparatus described herein.
Figure 8:
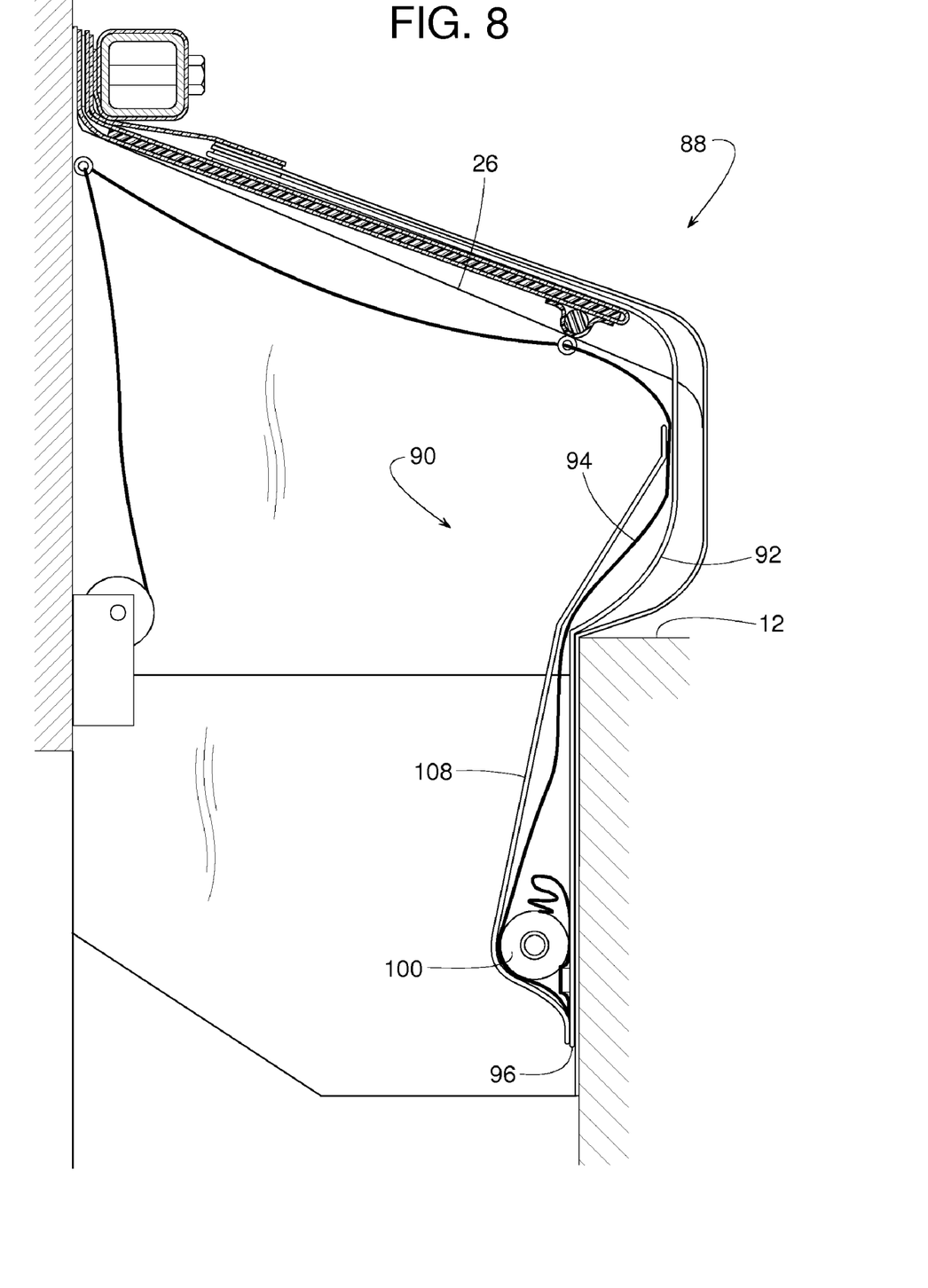
FIG. 8 is a cross-sectional view of the example dock apparatus of FIG. 7 with a vehicle engaging the example dock apparatus.
Figure 9:
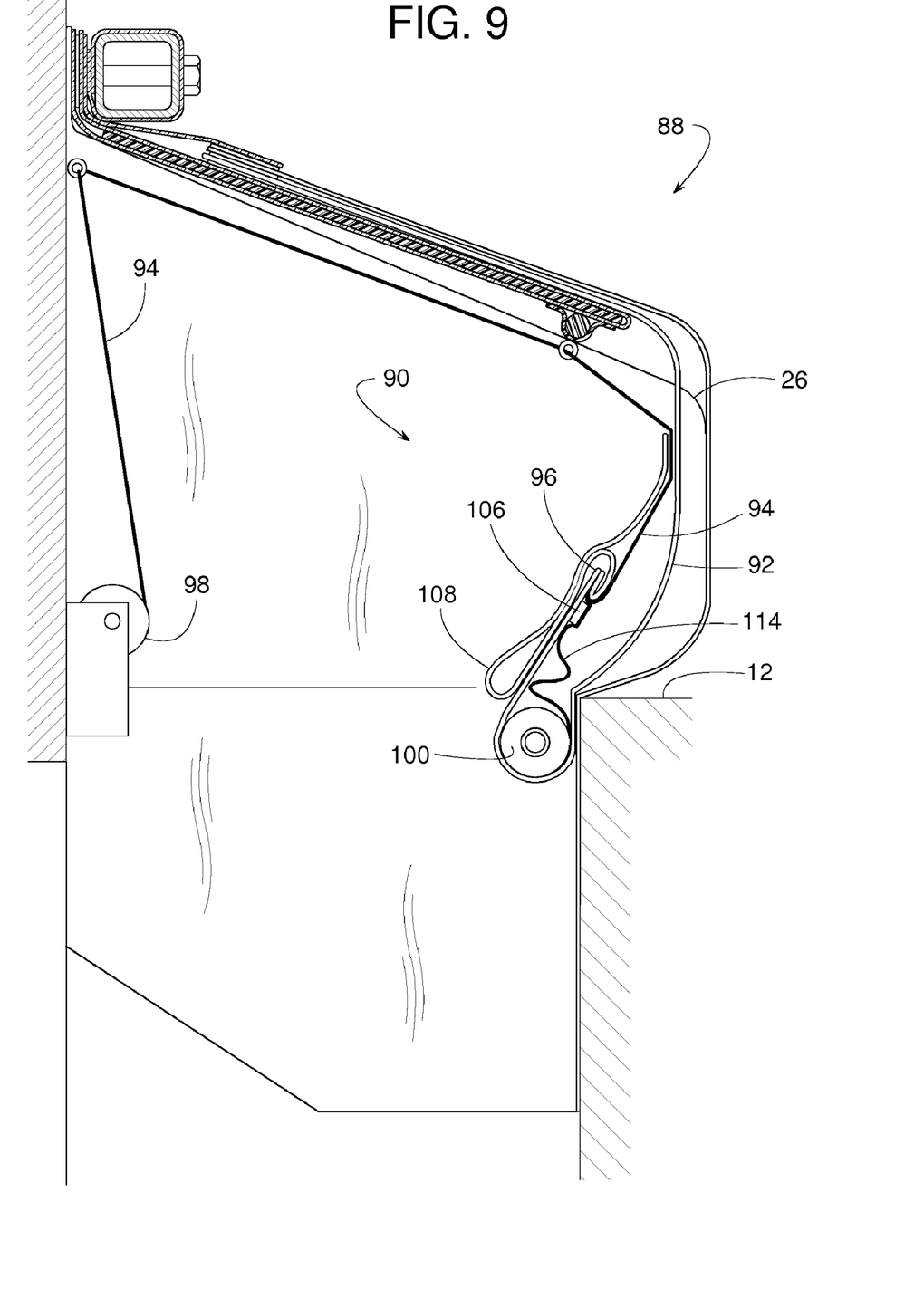
FIG. 9 is a cross-sectional view similar to FIG. 8 but showing a head curtain assembly of the example dock apparatus of FIGS. 7 and 8 in a retracted position.

In another example, FIGS. 7, 8 and 9 illustrate another example dock apparatus 88 having a head curtain assembly 90. In this example, dock apparatus 88 comprises a front curtain 92 suspended between two lateral weather barriers 26. To accommodate vehicles of various heights, a pliable elongate member 94 (e.g., a pull cord, rope, strap, chain, etc.) is coupled to a distal end 96 of front curtain 92 to selectively position distal end 96 between a lowered position (FIG. 7) and a raised position (FIG. 9). To adjust the height of curtain 92, elongate member 94 can be actuated by a motorized hoist 98 or manually pulled and released.

To ensure that front curtain 92 seals firmly against the rear of vehicle 12, a stiffener 100 is installed behind front curtain 92. Stiffener 100 is less flexible than front curtain 92 and is a horizontally elongate member that extends between the two lateral weather barriers 26 such that stiffener 100 becomes compressed horizontally between the two lateral weather barriers 26 as the lateral weather barriers are compressed by vehicle 12. Although the actual structure of stiffener 100 may vary, in some cases, stiffener 100 comprises a resilient foam cylinder 102 reinforced by a plastic tube 104. For additional stiffness, a resiliently flexible rod 106 can be attached to distal end 96 of front curtain 92.

In some examples, curtain assembly 90 includes a rear curtain 108 that helps contain and protect stiffener 100 and a lower section of elongate member 94. The lower end of rear curtain 108 connects to distal end 96 of front curtain 92. An upper end 110 of rear curtain 108 connects to the back side of front curtain 92 with one or more openings 112 for feeding elongate member 94 from the interior space between curtains 92 and 108 and externally mounted hoist 98 or cleat 86 (FIG. 5).

To help prevent stiffener 100 from escaping between curtains 92 and 108, a pliable retention member 114 may be used to attach stiffener 100 to an upper or lower end of curtain 92 and/or curtain 108. In some cases, retention member 114 is a sheet of pliable material that extends about the full length of stiffener 100.

Operation of dock apparatus 88 could begin with apparatus 88 in the lowered position, as shown in FIG. 7. Vehicle 12 backs into the dock and compresses the two lateral weather barriers 26, as shown in FIG. 8. In this position, lateral weather barriers 26 bulge inward toward each other (similar to FIG. 4), thereby holding stiffener 100 firmly up against the rear of vehicle 12. To prevent front curtain 92 from obstructing the rear access opening of vehicle 12, pliable elongate member 94 can be shorted to pull distal end 96 upward to the raised position of FIG. 9. As pliable elongate member 94 lifts distal end 96, front curtain 92 cradles and lifts stiffener 100, and rear curtain 108 folds over onto itself.

Once in the configuration of FIG. 9, bulging sections of lateral weather barriers 26 pressing stiffener 100 up against vehicle 12 holds curtain assembly 90 in the raised position, perhaps even if elongate member 100 is released (e.g., disengaged from a cleat or released by winch 98). However, when vehicle 12 departs while elongate member 94 is slack, curtain assembly 90 can freely and automatically fall back to the lowered position of FIG. 7.

If hoist 98 is used for raising curtain assembly 90 (as opposed to the manual option of FIGS. 5 and 6), the electrical current drawn by the hoist 98 can be sensed and used as a means for automatically stopping the lift of curtain 92. Lifting stiffener 100 from the lowered position of FIG. 8 to the raised position of FIG. 9 generally requires less current than it takes to lift stiffener 100 up and over the upper rear edge of vehicle 12, i.e., above and beyond the stiffener's position of FIG. 9. Such increase in current drawn by the hoist 98 could be used as a signal for stopping hoist 98 when stiffener 100 reaches its properly raised position. The operation of hoist 98 could also be controlled in concert with other dock-related equipment including, but not limited to, vehicle restraints, dock levelers, doors, vehicle sensors, etc.

To enhance a lateral weather barrier's ability to firmly hold a head curtain (e.g., including, but not limited to curtain or curtain assemblies 20, 90 or 120) up against the rear of vehicle 12, a lateral weather barrier can be provided with a flexible inner surface that is shaped such that the surface bulges in a particularly advantageous manner. Examples of such surfaces are illustrated in FIGS. 10-15. The surfaces in these examples are part of a boot, wherein the boot is considered as being part of a lateral weather barrier (i.e., the lateral weather barrier includes the boot). Such functionality was not possible in previous systems that did not have adequate lateral stiffness to be held in place by the inwardly-bulging lateral weather barriers 26.

Figure 10:
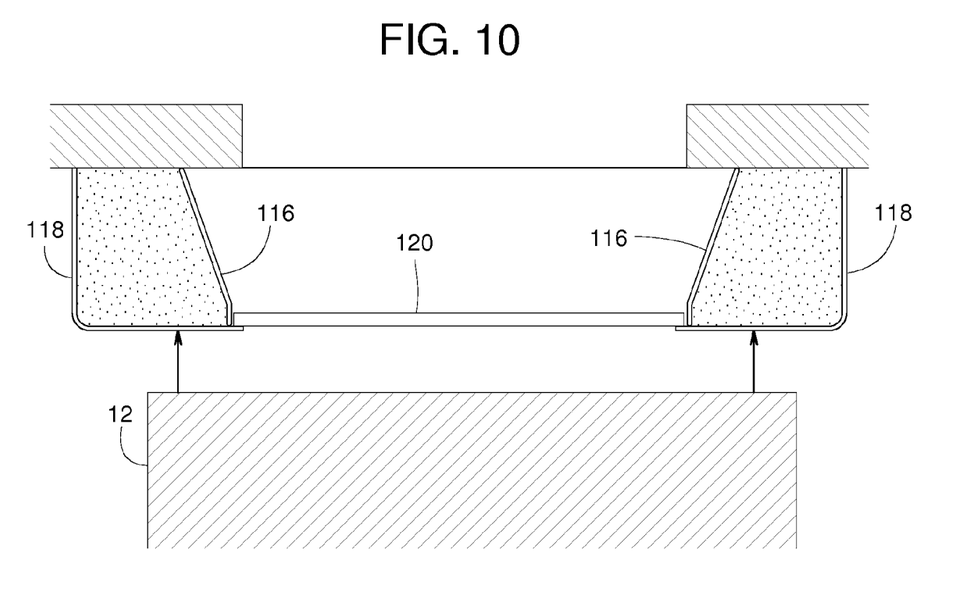
FIG. 10 is a cross-section view similar to FIG. 3 but showing another example dock apparatus described herein.
Figure 11:
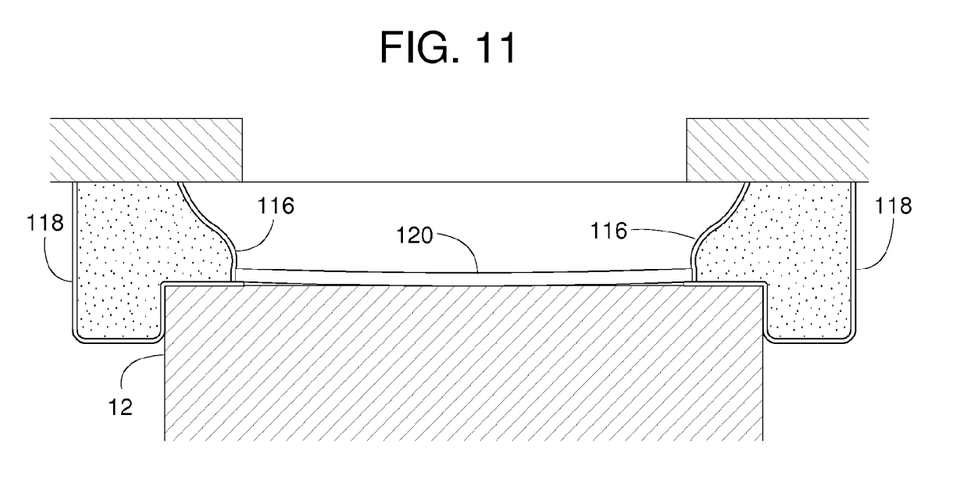
FIG. 11 is a cross-section view similar to FIG. 10 but showing a vehicle engaging the example dock apparatus of FIG. 10.

In FIGS. 10 and 11, two inner surfaces 116 of the boots of lateral weather barriers 118 allow some lateral clearance or light interference with curtain 120 when vehicle 12 is spaced apart from weather barriers 118, as shown in FIG. 10. Under compression by vehicle 12, however, surfaces 116 bulge toward each other to hold curtain 120 firmly against vehicle 12, as shown in FIG. 11. Surfaces 116 can be provided by a resiliently flexible panel similar to panel 29 of FIG. 2.

Figure 12:
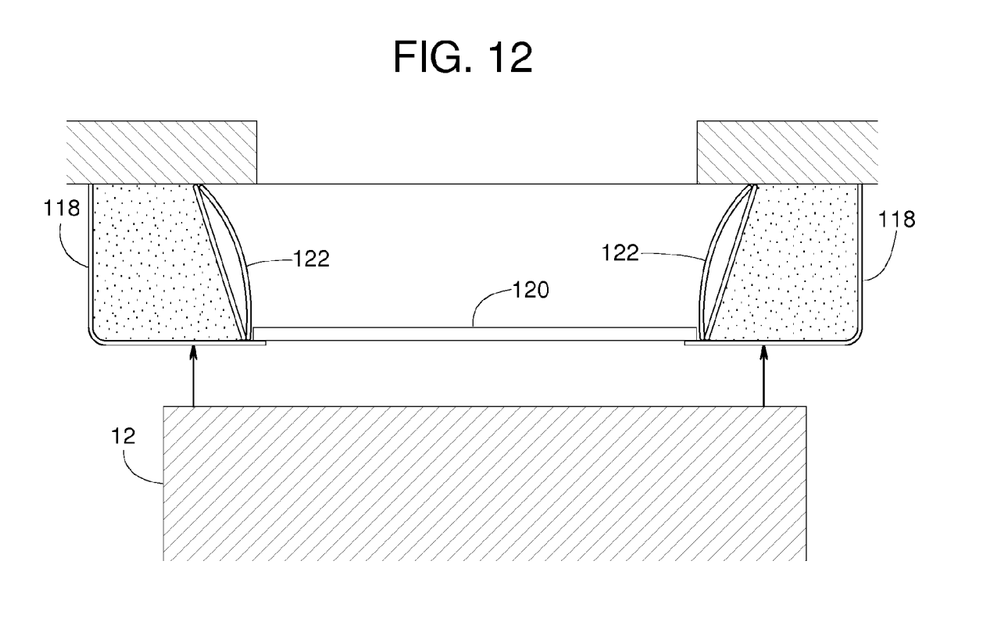
FIG. 12 is a cross-sectional view similar to FIG. 10 but showing another example dock apparatus described herein.
Figure 13:
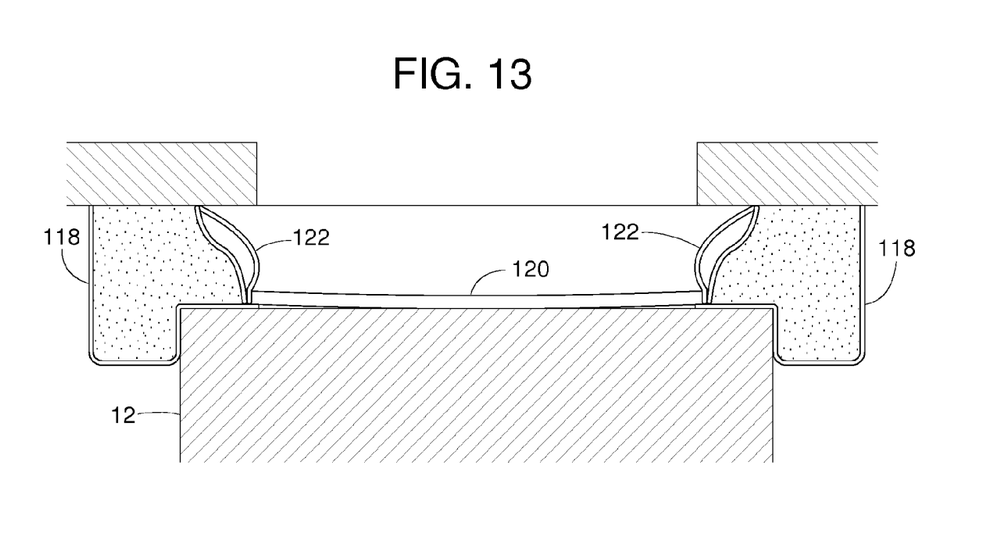
FIG. 13 is a cross-sectional view of the example of FIG. 12 but showing a vehicle engaging the example dock apparatus of FIG. 12.

In FIGS. 12 and 13, two inner surfaces 122 of the boots of lateral weather barriers 118 allow some lateral clearance or light interference with curtain 120 when vehicle 12 is spaced apart from weather barriers 118, as shown in FIG. 12. Under compression by vehicle 12, however, surfaces 122 bulge toward each other to hold curtain 120 firmly against vehicle 12, as shown in FIG. 13. Surfaces 122 can be provided by a resiliently flexible panel sewn or otherwise attached to a panel similar to panel 29 of FIG. 2.

Figure 14:
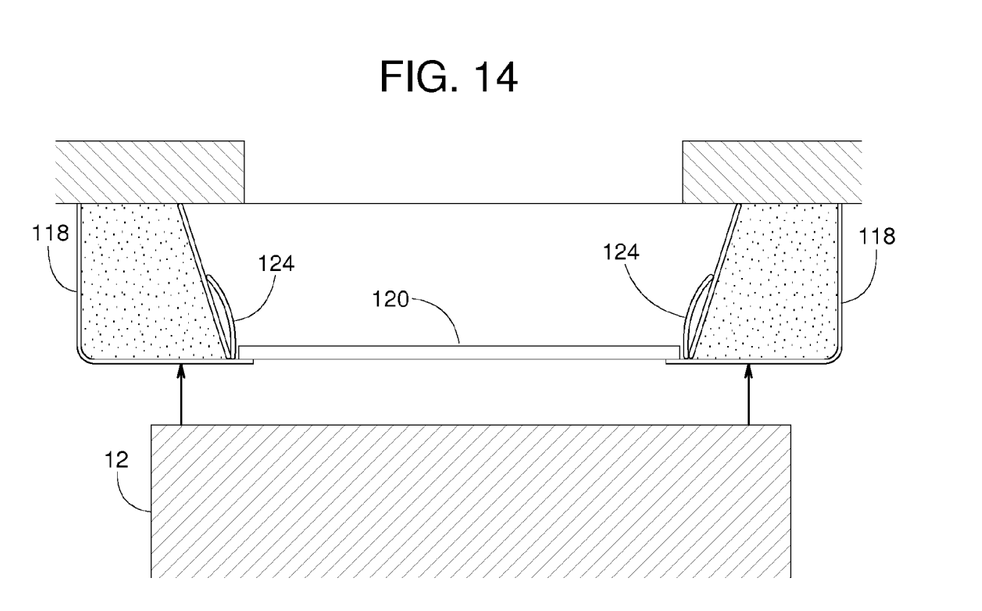
FIG. 14 is a cross-sectional view similar to FIG. 10 but showing yet another example dock apparatus described herein.
Figure 15:
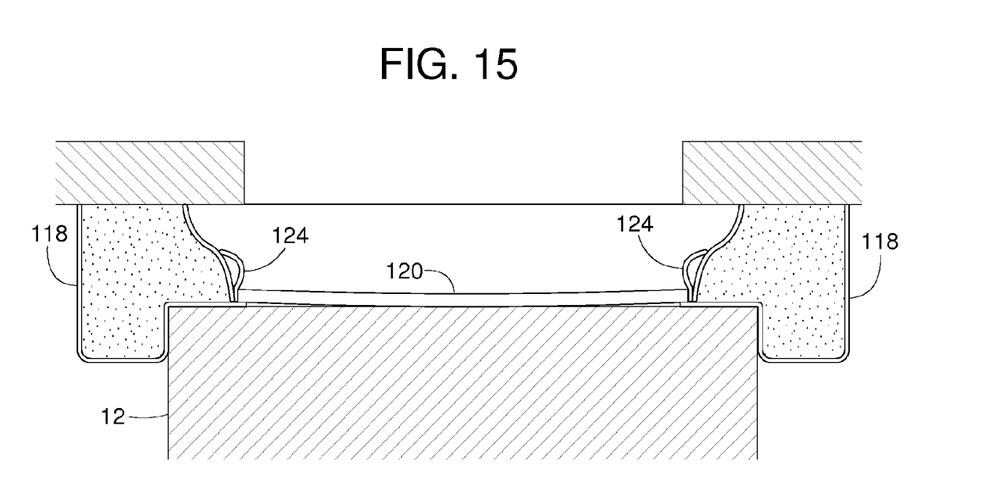
FIG. 15 is a cross-sectional view of the example of FIG. 14 but showing a vehicle engaging the example dock apparatus of FIG. 14.

In FIGS. 14 and 15, two inner surfaces 124 of the boots of lateral weather barriers 118 allow some lateral clearance or light interference with curtain 120 when vehicle 12 is spaced apart from weather barriers 118, as shown in FIG. 14. Under compression by vehicle 12, however, surfaces 124 bulge toward each other to hold curtain 120 firmly against vehicle 12, as shown in FIG. 15. Surfaces 124 can be provided by a resiliently flexible panel sewn or otherwise attached to a panel similar to panel 29 of FIG. 2.

It should be noted that existing dock seals with a compressible foam head pad can be retrofitted with the head curtain assemblies disclosed herein. In replacing an existing head pad, however, it may be beneficial to add a short vertical extension onto the existing side pads so that the new head curtain assembly is at sufficient height properly service vehicles of varying heights. Such an extension could be made similar to lateral weather barrier 26, only significantly shorter. The extension can include cavity 31 to reduce compressive forces at the boot.

At least some of the aforementioned examples include one or more features and/or benefits including, but not limited to, the following:

In some examples, a dock apparatus includes a retractable head curtain that is more flexible about a horizontal axis than a vertical one.

In some examples, the head curtain is supported by a resiliently compressible, creased foam panel.

In some examples, the creases in the foam panel are created by sewing the foam panel to a pliable cover using a series of horizontal stitch lines.

In some examples, the foam panel is removably attached to the head curtain.

In some examples, the head curtain is removably attached to a support panel.

In some examples, the support panel is stiffened by a readily replaceable fiberglass stay.

In some examples, the lower end of the head curtain is stiffened by a readily replaceable fiberglass stay.

In some examples, the dock apparatus includes a pair of protective boots that are readily replaceable.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

The invention claimed is:

1. A head curtain assembly for at least one of a dock shelter or dock seal at a doorway of a wall, wherein the dock shelter or dock seal includes two lateral weather barriers that are vertically elongate and each weather barrier having a respective front surface and an inner surface, the head curtain assembly comprising:
    a unitary foam panel mountable between the two lateral weather barriers and having a series of compressed indentations that renders the foam panel more flexible about a horizontal axis than about a vertical axis, and lateral edges each extending a length, wherein the unitary foam panel is disposed between the wall and the respective front surfaces of the two lateral weather barriers when the foam panel is in a pendent position to enable substantially the lengths of the lateral edges of the foam panel to be captured between the inner surfaces of the two lateral weather barriers when a vehicle engages the two lateral weather barriers and the foam panel.

2. The head curtain assembly of claim 1, further comprising a pliable cover and a plurality of stitches, wherein the plurality of stitches holds the foam panel to the pliable cover and holds the compressed indentations in compression.

3. The head curtain assembly of claim 1, wherein the series of compressed indentations are horizontally elongate.

4. The head curtain assembly of claim 1, further comprising:
    an upper sheet mountable above the two lateral weather barriers;
    a curtain suspended from the upper sheet; and
    a detachable fastener that removably fastens the foam panel to the curtain.

5. The head curtain assembly of claim 1, further comprising:
    an upper sheet mountable above the two lateral weather barriers;
    a curtain suspended from the upper sheet, wherein the foam panel is attached to the curtain; and a resiliently flexible rod attached to a lower end of the curtain, wherein the resiliently flexible rod is horizontally elongate.

6. The head curtain assembly of claim 1, further comprising:
   a support panel mountable above the two lateral weather barriers such that the support panel engages the lateral weather barriers, wherein the support panel is resiliently flexible and horizontally elongate;
   an upper sheet overlapping the support panel; and
   a curtain suspended from the upper sheet, wherein the foam panel is attached to the curtain, and wherein the foam panel is to engage respective inner surfaces of the lateral weather barriers when a vehicle engages the weather barriers and the foam panel.

7. The head curtain assembly of claim 6, further comprising a detachable fastener that removably fastens the upper sheet to the support panel.

8. The head curtain assembly of claim 6, further comprising a resiliently flexible rod coupled to the support panel, wherein the resiliently flexible rod is horizontally elongate.

9. The head curtain assembly of claim 1, further comprising:
   an upper sheet mountable above the two lateral weather barriers;
   a curtain suspended from the upper sheet and supporting the foam panel, wherein the curtain is suspended adjacent a surface of the foam panel that is oriented away from the doorway; and
   a pair of flexible boots overlapping the upper sheet, overlapping the curtain, and overlapping three sides of each of the two lateral weather barriers.

10. The head curtain assembly of claim 9, further comprising a detachable fastener that removably fastens the pair of flexible boots to at least one of the upper sheet, the curtain and the two lateral weather barriers.

11. A dock apparatus engagable by a vehicle at a doorway of a wall, the dock apparatus comprising:
   two lateral weather barriers that are vertically elongate and compressible by the vehicle; and
   a unitary foam panel being mountable between the two lateral weather barriers and having a series of compressed indentations that render the foam panel more flexible about a horizontal axis than about a vertical axis, and lateral edges each extending a length, wherein substantially the lengths of the lateral edges of the foam panel is are continuously in a position so that the foam panel is to be horizontally compressed between the two lateral weather barriers as a result of the vehicle compressing the two lateral weather barriers.

12. The dock apparatus of claim 11, wherein the series of compressed indentations are horizontally elongate.

13. The dock apparatus of claim 11, further comprising:
   an upper sheet mountable above the two lateral weather barriers;
   a curtain suspended from the upper sheet; and
   a disconnectable fastener that removably fastens the foam panel to the curtain.

14. The dock apparatus of claim 11, further comprising:
   an upper sheet mountable above the two lateral weather barriers;
   a curtain suspended from the upper sheet, wherein the foam panel is attached to the curtain, and wherein lateral edges of the curtain are to be engaged by respective inner surfaces of the two lateral weather barriers when a vehicle engages the two lateral weather barriers; and
   a resiliently flexible rod attached to a lower end of the curtain, wherein the resiliently flexible rod is horizontally elongate.

15. The dock apparatus of claim 11, further comprising:
   a support panel mountable above the two lateral weather barriers such that the support panel directly engages upper surfaces of the two lateral weather barriers, wherein the support panel is resiliently flexible and horizontally elongate;
   an upper sheet overlapping the support panel; and
   a curtain suspended from the upper sheet, wherein the foam panel is attached to the curtain.

16. The dock apparatus of claim 15, further comprising a resiliently flexible rod coupled to the support panel, wherein the resiliently flexible rod is horizontally elongate.

17. A head curtain assembly for at least one of a dock shelter or dock seal at a doorway of a wall, wherein the dock shelter or dock seal includes two lateral weather barriers that are vertically elongate and each weather barrier having a respective inner surface, the head curtain assembly comprising:
   a unitary foam panel being mountable between the two lateral weather barriers and having a series of compressed indentations that render the foam panel more flexible about a horizontal axis than about a vertical axis;
   a pliable cover and a plurality of stitches, wherein the plurality of stitches holds the foam panel to the pliable cover and holds the compressed indentations in compression;
   an upper sheet mountable to a support panel disposed above and engaging the two lateral weather barriers;
   a curtain having lateral edges and suspended from the upper sheet and supporting the foam panel; and
   a pair of flexible boots overlapping the upper sheet, overlapping the curtain, overlapping three sides of each of the two lateral weather barriers, and having respective inner surfaces, wherein the lateral edges of the curtain engage at least one of the inner surfaces of the lateral weather barriers or the inner surfaces of the flexible boots.

18. The head curtain assembly of claim 17, further comprising a disconnectable fastener that removably fastens the foam panel to the curtain.

19. The head curtain assembly of claim 17,
   wherein the upper sheet overlaps the support panel, wherein the support panel is resiliently flexible and horizontally elongate, and wherein
   a disconnectable fastener removably fastens the upper sheet to the support panel.

20. The head curtain assembly of claim 17, further comprising a disconnectable fastener that removably fastens the pair of flexible boots to at least one of the upper sheet, the curtain and the two lateral weather barriers.

21. A dock apparatus engagable by a vehicle at a doorway of a wall, the dock apparatus comprising:
   two lateral weather barriers that are vertically elongate and compressible by the vehicle;
   a front curtain suspended between the two lateral weather barriers, the curtain comprising a unitary foam panel mounted between the two lateral weather barriers and having a series of compressed indentations that renders the foam panel more flexible about a horizontal axis than about a vertical axis, wherein lateral edges of the front curtain seal against respective inner surfaces of the lateral weather barriers such that when the vehicle engages the lateral weather barriers, the inner surfaces of the lateral weather barriers bulge inwardly to forcibly hold the front curtain sealingly tight against a rear upper edge of the vehicle;

a pliable elongate member coupled to a distal end of the front curtain, wherein the pliable elongate member selectively positions the distal end of the front curtain between a raised position and a lowered position; and a stiffener adjacent the front curtain, the stiffener is less flexible than the front curtain, the stiffener is horizontally elongate and extends between the two lateral weather barriers such that the stiffener is compressed horizontally between the two lateral weather barriers in response to the vehicle compressing the two lateral weather barriers, the stiffener is closer to the distal end of the front curtain when the distal end is at the lowered position than when the distal end is at the raised position.

22. The dock apparatus of claim 21, further comprising a rear curtain connected to the front curtain, wherein the stiffener is interposed between the front curtain and the rear curtain.

23. The dock apparatus of claim 21, wherein the stiffener is comprised of resiliently compressible foam.

24. The dock apparatus of claim 21, wherein the stiffener is generally cylindrical.

25. The apparatus of claim 22, wherein the pliable elongate member extends between the front curtain and the rear curtain.

26. The apparatus of claim 21, wherein the distal end of the front curtain automatically falls toward the lowered position and the stiffener automatically falls toward the distal end of the front curtain when the vehicle disengages the dock apparatus.

27. The apparatus of claim 21, further comprising a motorized winch coupled to the pliable elongate member.

28. A dock apparatus engagable by a vehicle at a doorway of a wall, the dock apparatus comprising:

a first elongate weather barrier and a second elongate weather barrier positioned laterally of the doorway in a spaced apart relationship, wherein the first and second elongate weather barriers are compressible by the vehicle;

a third elongate weather barrier spanning the space between the first and second weather barriers;

a curtain coupled to the third elongate weather barrier and having lateral edges that seal against inner surfaces of the respective first and second elongate weather barriers; the curtain comprising a unitary foam panel mounted between the two lateral weather barriers and having a series of compressed indentations that renders the foam panel more flexible about a horizontal axis than about a vertical axis;

a flexible boot overlapping at least a portion of the first, second and third weather barriers and the curtain; and a fastener to removably couple the flexible boot to at least one of the first or second weather barriers.

29. The dock apparatus of claim 28, wherein the flexible boot overlaps three sides of the first or second weather barrier.

30. The dock apparatus of claim 28, wherein the fastener is a fabric hook-and-loop fastener.

31. The dock apparatus of claim 28, wherein the flexible boot overlaps the support panel, and wherein the support panel is disposed on the first and second elongate members.

* * * * *

UNITED STATES PATENT AND TRADEMARK OFFICE
CERTIFICATE OF CORRECTION

Page 1 of 1

PATENT NO. : 8,042,307 B2
APPLICATION NO. : 12/129159
DATED : October 25, 2011
INVENTOR(S) : Digmann et al.

It is certified that error appears in the above-identified patent and that said Letters Patent is hereby corrected as shown below:

Column 7, line 48 (claim 11), after "panel" delete "is".

Signed and Sealed this
Fourteenth Day of February, 2012

David J. Kappos
*Director of the United States Patent and Trademark Office*